United States Patent [19]

Poccard

[11] Patent Number: 4,715,567
[45] Date of Patent: Dec. 29, 1987

[54] SYSTEM FOR COUPLING TWO FLAPS OF AN AIRCRAFT WING, AND AN AIRCRAFT WING EQUIPPED WITH SUCH A SYSTEM

[75] Inventor: Jacques Poccard, Levignac, France

[73] Assignee: Aerospatiale Societe Nationale Industrielle, Paris, France

[21] Appl. No.: 939,140

[22] Filed: Dec. 8, 1986

[30] Foreign Application Priority Data

Dec. 13, 1985 [FR] France .................. 85 18515

[51] Int. Cl.[4] .............................................. B64C 9/02
[52] U.S. Cl. .................. 244/213; 244/75 R; 244/129.1; 244/215; 74/519; 74/412 TA
[58] Field of Search ............... 244/213, 214, 215, 216, 244/75 R, 1 R, , 129.1; 116/264, 265, 36, 173, 281-284, 311-312; 74/303, 294, 519, 412 TA

[56] References Cited

U.S. PATENT DOCUMENTS

| | | | |
|---|---|---|---|
| 3,986,689 | 10/1976 | Maltby | 244/213 |
| 4,213,587 | 7/1980 | Roeseler et al. | 244/213 |
| 4,494,716 | 1/1985 | Breedveld et al. | 244/75 R |

*Primary Examiner*—Galen Barefoot
*Attorney, Agent, or Firm*—Fisher, Christen & Sabol

[57] ABSTRACT

A system for coupling together two flaps of an aircraft wing, which flaps are adjacent and are situated at least substantially in the extension of each other. Each flap has its own pivoting and drive means. The system includes a mechanical coupling which connects the two flaps together and which is intended to ensure synchronized operation thereof. The system further includes a mechanical emergency connection able to take over the function of the mechanical coupling should this latter fail. The transfer of function between the mechanical coupling and the mechanical emergency connection causes the movement of at least one mechanical signaling member.

7 Claims, 4 Drawing Figures

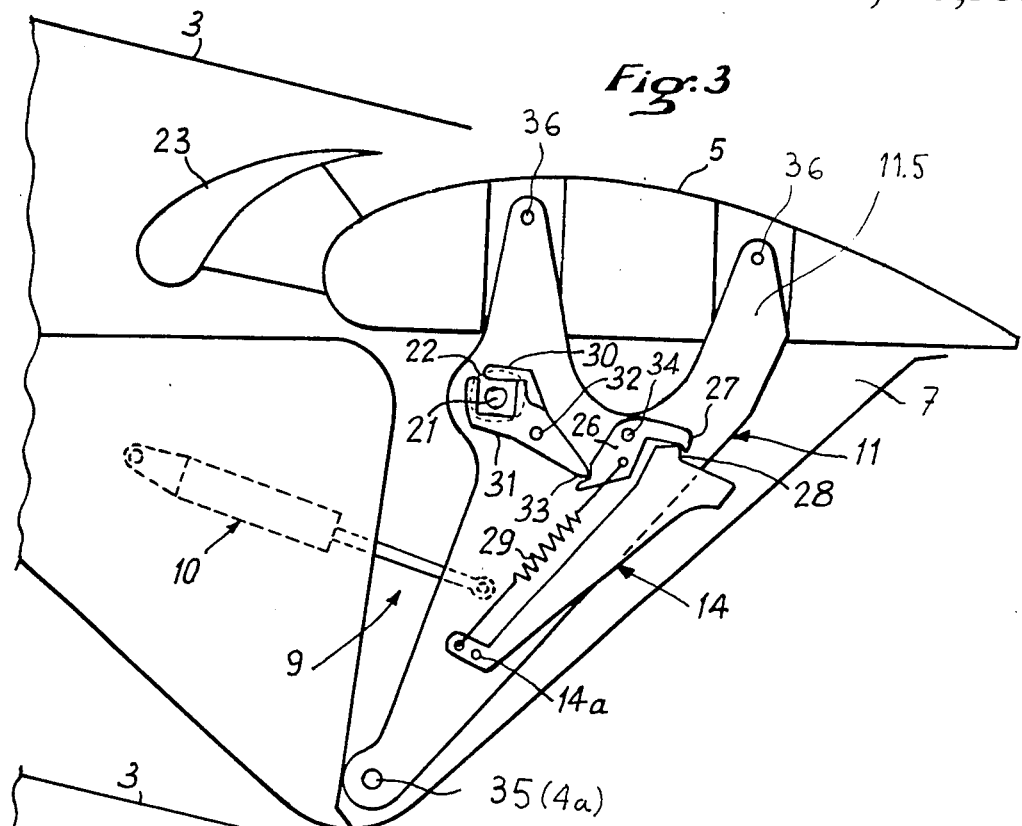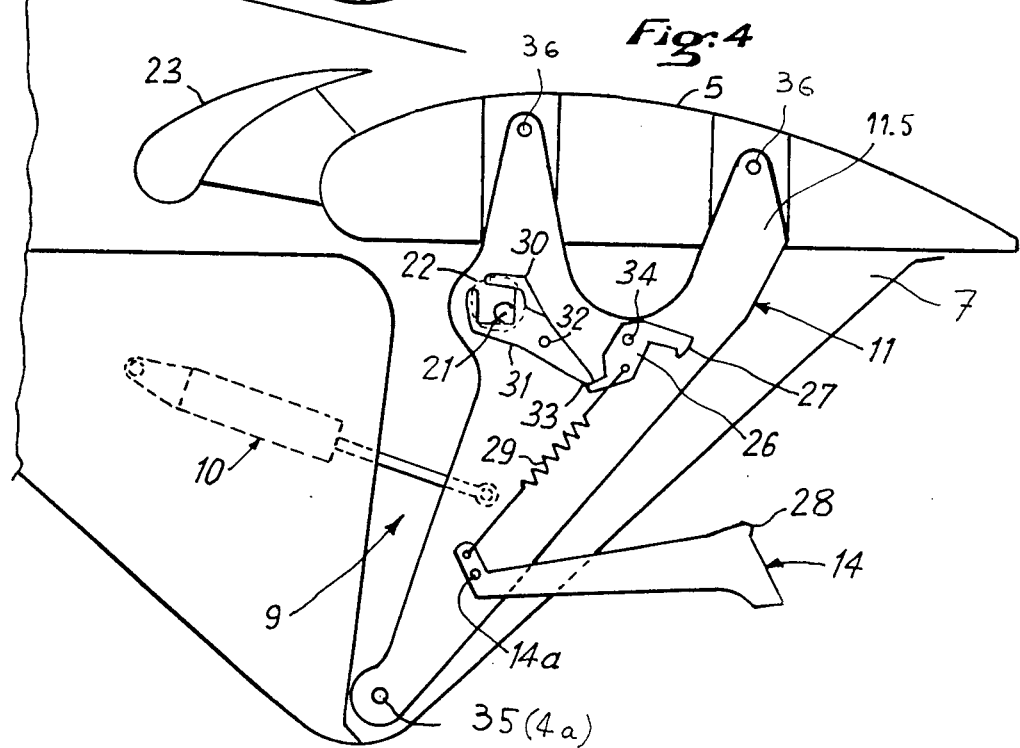

SYSTEM FOR COUPLING TWO FLAPS OF AN AIRCRAFT WING, AND AN AIRCRAFT WING EQUIPPED WITH SUCH A SYSTEM

BACKGROUND OF THE INVENTION

The present invention relates to a system for coupling together two flaps of an aircraft wing, said flaps being adjacent and situated at least substantially in the extension of each other, and each flap having its own pivoting and actuating means, as well as an aircraft wing equipped with this system.

A system is already known for coupling together two adjacent flaps of an aircraft wing including a mechanical coupling which connects the two flaps together and which is intended to ensure synchronized operation thereof.

In particular, in aircraft having high-lift flaps comprising two flaps per wing, each flap moves in rotation about an axis situated outside the profile of the wing while being controlled for example by means of a hydraulic actuating cylinder. Synchronization of the relative movements of the two flaps is obtained by means of said mechanical coupling. However, the essential drawback of this type of system resides in the fact that if the mechanical coupling between the two flaps fails, the synchronization of the movements thereof is of course no longer provided. the flaps may then remain locked in the extended position, which causes a reduction of the performances of the aircraft, an aerodynamic imbalance thereof and an excessive fuel consumption.

SUMMARY OF THE INVENTION

The object of the present invention is then to overcome this drawback by providing a coupling system between two flaps of an aircraft wing, which remains reliable even should the mechanical coupling joining said two flaps together fail and which further allows the failure of the usual mechanical coupling to be reliably detected.

To this end, in accordance with the invention, the system for coupling together two flaps of an aircraft wing, of the above decribed type, is remarkable in that it has in addition a mechanical emergency connection capable of accomplishing the function of the mechanical coupling should this latter fail, and in that the transfer of function between the mechanical coupling and the mechanical emergency connection involves the movement of at least one mechanical signalling member.

The movement of the mechanical signalling member or members may be controlled either by the failure of said mechanical coupling or by actuation of the mechanical emergency connection.

According to other features of the invention, said mechanical coupling includes at least one link whose general direction is substantially perpendicular to the span of the wing, and which is disposed between the adjacent flaps, while being articulated at one end to one of said flaps and at the other end to the other flap. The mechanical emergency connection, disposed between the adjacent flaps, preferably includes at least one finger integral with one of said flaps and engaged, with a predetermined play, in a housing provided in the other flap.

Advantageously, the mechanical signalling member includes at least one lever able to pivot between two positions, the first of which corresponds to the normal operation of the mechanical coupling and in which the lever is not visible and the second corresponds to a failure of said mechanical coupling and/or to the actuation of the mechanical emergency coupling, the lever then being visible.

In particular, the actuation of the mechanical emergency connection causes a bolt to pivot and lock said lever in its first non visible position and having at least one means forming a pawl adapted for cooperating with a projection on the lever, pivoting releasing the connection between the bolt and the lever so that this latter pivots into said second position. The pivoting of the bolt may be obtained by moving at least one pivoting member following a predetermined movement of the finger of the emergency mechanical connection into its housing.

In a particular embodiment, two pivoting members may be provided clamping said finger in the manner of the jaws of a gripper.

BRIEF DESCRIPTION OF THE DRAWINGS

The figures of the accompanying drawing will clearly show how the invention can be implemented.

FIG. 3 is a schematical sectional view through the plane of the slit separating the two flaps, showing the signalling member of the invention in the non visible position, and FIG. 4 is a view similar to FIG. 3 showing the mechanical signalling member of the invention in the visible position.

DESCRIPTION OF THE PREFERRED EMBODIMENT

Figure 1:
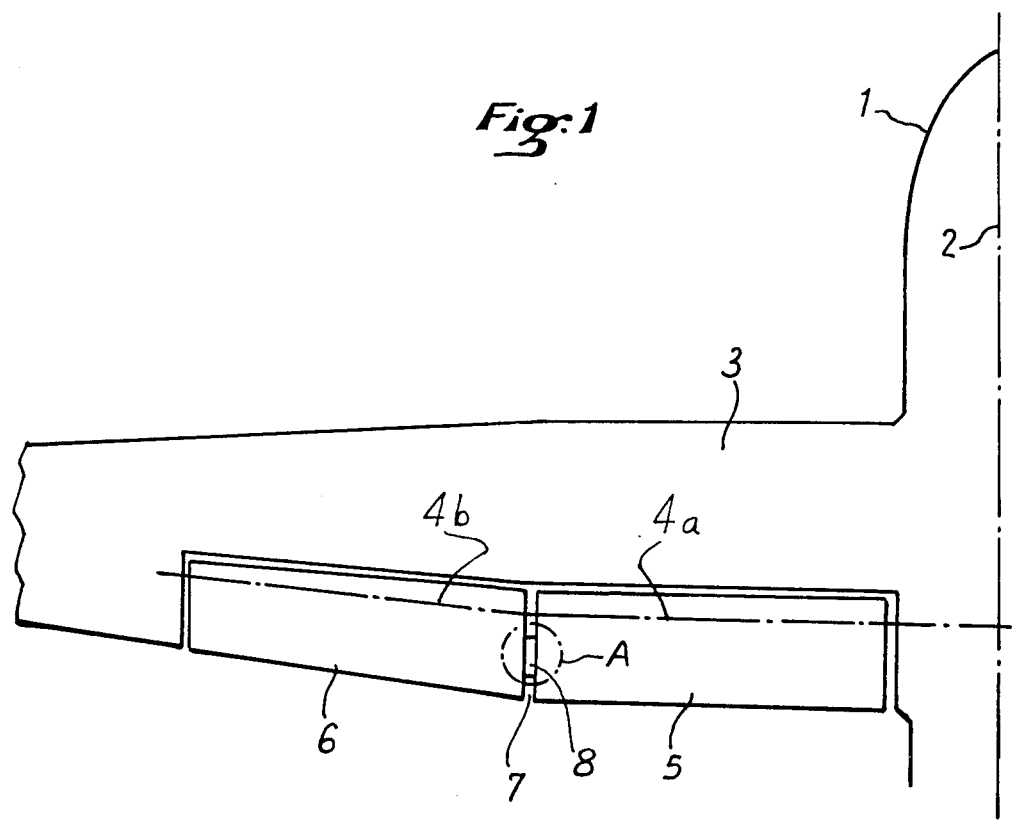
FIG. 1 is a schematical top view of an aircraft wing comprising an internal high-lift flap and an external high-lift flap, as well as a part of the fuselage of the aircraft.

In FIGS. 3 and 4, only the mechanical emergency connection between said internal and external high-lift flaps has been shown, said mechanical coupling not having been shown so as not to overload the drawing. In addition, in FIGS. 1 to 4, identical references designate identical or similar elements.

In FIG. 1 has been shown a part of the fuselage 1, with longitudinal axis 2, of an aircraft having a wing 3 with an internal flap 5 and an external flap 6, separated by a slit 7, in which is provided a mechanical system 8 for coupling the two flaps together. Usually the two flaps 5 and 6 which are for example high-lift flaps may move in rotation about respective axes 4a and 4b, situated outside the profile of the wing. As can be seen in greater detail in FIGS. 3 and 4 which show more particularly the flap 5 in a side view, each of said flaps 5 and 6 is controlled by its own pivoting and drive means 9 including in particular the hydraulic cylinder 10 and a pivoting support 11. At its lower part, each pivoting support 11 includes an articulation 35 for pivoting a flap 5 (or 6) about the axis 4a (or 4b) and, at its upper part, securing means 36 for flap 5 (or 6).

The axes of rotation 4a, 4b of each of the two flaps 5 and 6 may be aligned, or be simply concurrent in the junction zone of the two flaps and have therebetween, as shown in FIG. 1, an angular shift resulting from the geometry of the wings.

Figure 2:
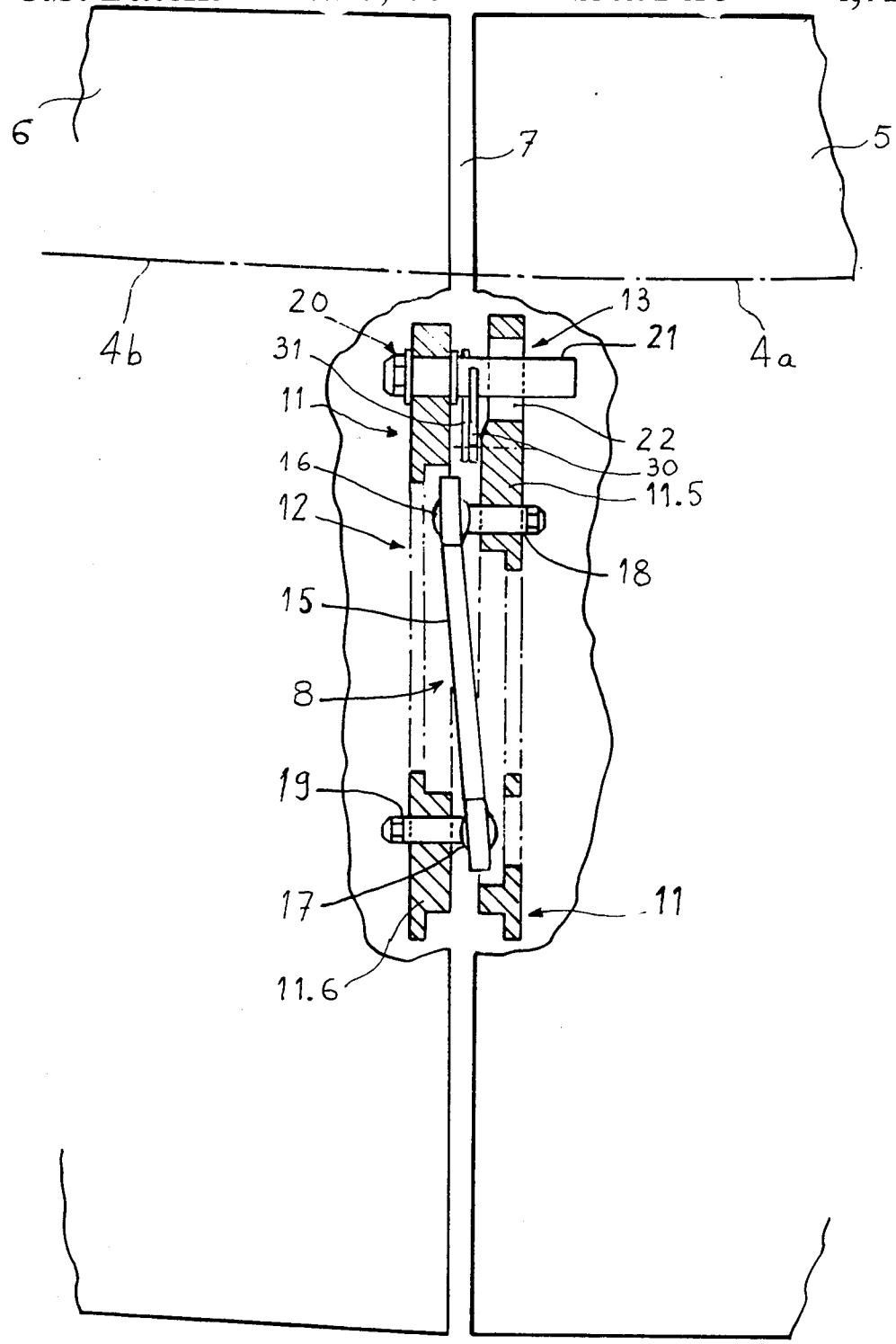
FIG. 2 is an enlarged view in partial section with parts cut away of zone A of FIG. 1, showing the mechanical coupling and the mechanical emergency connection of the invention.

Referring more particularly to FIG. 2, the system 8 for coupling the two flaps 5 and 6 together usually includes a mechanical coupling 12 connecting the two flaps 5 and 6 together and which is intended to ensure the synchronized operation thereof.

According to the invention, the system 8 for coupling the two flaps 5 and 6 together further includes a mechanical emergency connection 13 able to accomplish the function of the mechanical coupling 12 should this latter fail and, in addition, the transfer of function between the mechanical coupling 12 and the mechanical emergency connection 13 causes at least one mechanical signalling member 14 to move, this mechanical signalling member being shown in FIGS. 3 and 4.

Referring to FIG. 2, the mechanical coupling 12 includes a link 15 whose general direction is substantially perpendicular to the span of wing 3, and which is disposed in the slit 7 between the adjacent flaps 5 and 6. The link 15 is articulated at one end to one of said flaps and at the other end to the other flap. In the example shown in Figure 2, the ends of link 15 cooperate with ball joints 16, 17 carried respectively by shafts 18 and 19. These shafts 18 and 19 are fixed respectively to adjacent parts 11.5 and 11.6 of the pivoting supports 11 of flaps 5 and 6.

The mechanical emergency connection 13, disposed between the adjacent flaps 5 and 6, includes a finger 21 integral with one of said flaps (in FIG. 2, finger 21 is fixed at 20 to the part 11.6 of the pivoting support 11 of flap 6). Finger 21 projects from flap 6 in the direction of flap 5 and is engaged, with a predetermined play, in a housing 22 provided in part 11.5 of the pivoting support 11 of said flap 5.

In FIGS. 3 and 4 it can be seen that the mechanical signalling member 14 includes, in the example shown, a lever able to pivot, during transfer of function between the mechanical coupling 12 and the mechanical emergency connection 13, between two positions the first of which corresponds to normal operation of the mechanical coupling 12, in which position lever 14 is not visible (FIG. 3), and the second corresponds to a failure of said mechanical coupling 12 and to actuation of the mechanical emergency connection 13, lever 14 then becoming visible (FIG. 4).

Lever 14 may be housed, in the non visible position, in a housing (not shown) and, during pivoting thereof, may pass through a slit provided in the housing.

In particular, actuation of the mechanical emergency connection 13 causes a bolt 26 to pivot and to lock lever 14 in the non visible position (FIG. 3) and which is provided with a pawl 27 adapted for cooperating with the projection 28 on lever 14. Pivoting of bolt 26, against return means 29, releases the connection between this latter and lever 14 so that this latter pivots, about the pin 14a, into the visible position shown in FIG. 4. The return means 29 are for example formed by a spring, disposed between the bolt 26 and the end of lever 14 about which this latter may pivot.

In the example shown, pivoting of bolt 26 is caused by movement of at least one pivoting member 30, 31 following a predetermined movement of finger 21 into its housing 22. In particular, two pivoting members 30 and 31 may be provided able to pivot about a pin 32 and enclosing therebetween said projecting finger 21, in the manner of the jaws of a gripper, the rotation of the end 33 of one or other of said members 30 and 31, or of both, causing bolt 26 to rotate about its pin 34, which releases the lever 14.

The operation of the system of the invention will now be described in detail.

In flight, three possibilities may occur.

In the normal operating cases, each hydraulic cylinder 10 balances at least approximately the aerodynamic load on the flap which is associated therewith. It is then link 15 alone which synchronizes the rotations of flaps 5 and 6 and transmits a small force corresponding to the balancing of the aerodynamic forces and of the forces of the cylinders between the two flaps.

In the case when, for any reason, such as the blocking of a flap or the breakage of a cylinder fastening, the synchronization of the rotational movements of the two adjacent flaps 5 and 6 is no longer provided, link 15 provides the connection between flaps 5 and 6 while being capable of transmitting the force corresponding to the driving of a flap.

In the case of a breakage or disconnection of link 15, the mechanical emergency connection 13 comes into action. Finger 21 integral with one flap comes into contact with the walls of the housing 22 provided in the adjacent flap, so as to ensure synchronization of the flaps with a slight shift corresponding to the play between finger 21 and its housing 22. It should be noted that this shift is reduced and disappears when the flaps are retracted. Thus, if there is a failure of link 15 as connecting member between the flaps providing synchronization of the movement thereof, the mechnical emergency connection 13 of the invention replaces it completely in its functions. The transfer of function between the mechanical coupling 12 and the mechnical emergency connection 13 further causes the movement of the mechanical signalling member 14.

As mentioned above, the two pivoting members 30 and 31 pivot about pin 32 under the action of finger 21, the rotational movement of the end 33 of one of members 30 or 31, or of both, causing rotation of bolt 26 about pin 34 which releases the lever 14. This latter thus released pivots under the action of its own weight about pin 14a, and, extending through the slit in the casing, becomes visible. This lever may be painted in a bright color, for example in red, which makes it more visible when it is extended. Thus, it is immediately clear on the ground if the mechanical emergency connection has been used and if necessary, accordingly, to provide a replacement of link 15 for example. Thus the risk of a dormant breakdown is avoided. It will be noted that the system of the invention, although simple, is particularly reliable, the mechanical emergency connection being able to take over completely the function of the conventional mechanical coupling and actuation thereof is reliably signalled with the invention.

What is claimed is:

1. A system for coupling together two flaps of an aircraft wing, adjacent and at least substantially aligned along said wing, each flap having its own pivoting and drive means, said system comprising:

first mechanical coupling means (12, 15) intended to ensure the synchronized operation of said two flaps;

second mechanical emergency coupling means (13, 21, 22) able to take over the function of said first mechanical coupling means in case of failure thereof, said second mechanical emergency coupling means being disposed between said adjacent flaps and including at least one finger (21) integral with one of said flaps and engaged, with a predetermined play, in a recess (22) provided in the other flap;

at least one mechanical device (14) intended for signaling the transfer of function between said first and second mechanical coupling means, said mechanical device having at least one lever able to move between two positions, the first of which corresponds to normal operation of said first mechanical coupling means, in which position the lever is not visible, and the second of which corresponds to a failure of said first mechanical coupling means, in which position the lever is visible;

a controllable bolt (26) for locking said lever in its first non-visible position; and sensor means (30, 31) for detecting the position of said finger (21), said sensor means causing release of the locking between said bolt and said lever when said first mechanical coupling means fails, thus allowing said lever to take its second visible position.

2. The system as claimed in claim 1 wherein said first mechanical coupling means includes at least one link whose general direction is substantially perpendicular to the span of the wing, and which is disposed between the adjacent flaps, while being articulated at one end to one of said flaps and at the other end of the other flap.

3. The system as claimed in claim 1 wherein said lever pivots under the action of its own weight from its first position to its second position, when the locking between said bolt and said lever is released by said sensor means.

4. The system as claimed in claim 1 wherein said sensor means causes said bolt to pivot, said bolt cooperating with a projection of said lever, pivoting of said bolt causing release of the locking between the bolt and the lever so that this latter pivots into said second position.

5. The system as claimed in claim 1 wherein said sensor means comprises at least one pivoting member following a predetermined movement of said finger into said recess.

6. The system as claimed in claim 1 wherein said sensor means comprises two pivoting members enclosing said finger with play in the manner of the jaws of a gripper.

7. An aircraft wing equipped with at least one system as claimed in claim 1.

* * * * *